E. P. FOWLER.
Folding Spring Bed-Bottom.
No. 162,639.  Patented April 27, 1875.
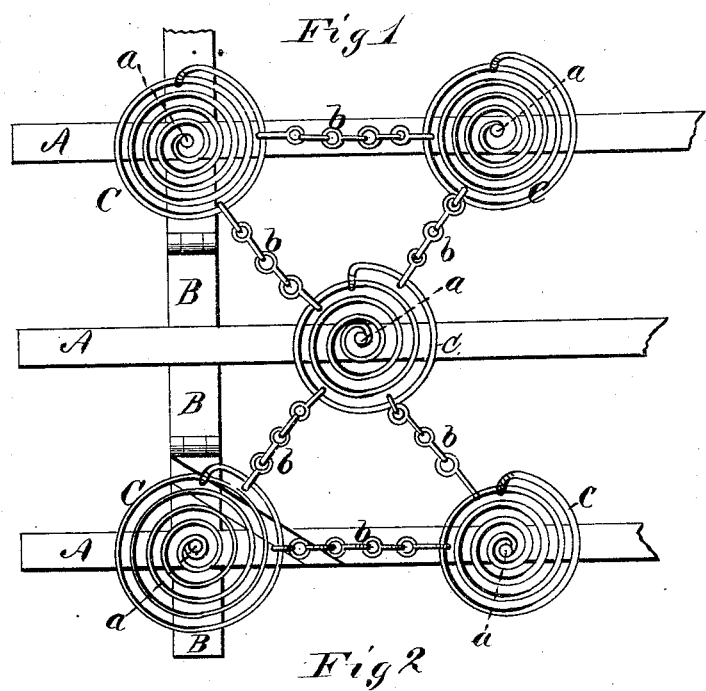
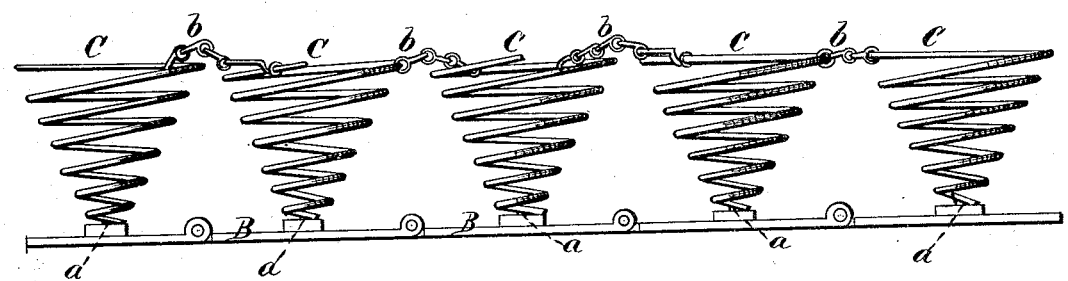
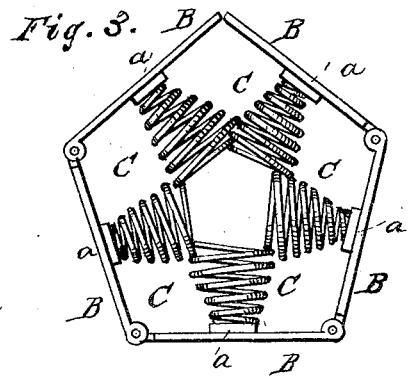
Witnesses:  Inventor
F. L. Durand  E. P. Fowler
Fred Keischer  per
  T. H. Alexander
  atty.

UNITED STATES PATENT OFFICE.

EDWIN P. FOWLER, OF BROOKLYN, NEW YORK.

IMPROVEMENT IN FOLDING SPRING BED-BOTTOMS.

Specification forming part of Letters Patent No. 162,639, dated April 27, 1875; application filed October 16, 1874.

*To all whom it may concern:*

Be it known that I, E. P. FOWLER, of Brooklyn, in the county of Kings and State of New York, have invented certain new and useful Improvements in Spring Bed-Bottoms; and I do hereby declare that the following is a full, clear, and exact description thereof, reference being had to the accompanying drawings, and to the letters of reference marked thereon, which form part of this specification.

The nature of my invention consists in the construction and arrangement of a spring bed-bottom, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a side elevation.

A A represent a series of bars or slats of suitable dimensions to form the supports for the springs. Each of the bars A is, at a suitable distance from each end, provided with a short cross-bar, B, firmly fastened thereto and projecting equally on both sides thereof. The cross-bars B B are made in sections, and, their ends being formed into hinge-butts, are hinged together, as shown, thereby uniting or connecting the bars or slats A A parallel with each other, and forming a folding frame. On the upper sides of the bars or slats A A, at suitable intervals, are fastened headed pins or rivets *a a*, which are arranged alternately, or, in other words, the pins on one bar are opposite to the center of the spaces between the pins on the adjoining bar, and so on throughout the entire series. On or to each pin *a* is secured the lower small end of a spiral spring, C, and the upper larger ends of these springs are connected together by means of links *b b*. The springs C C are arranged alternately—that is, those on one slat should be opposite the space between those on the slats on either side of it.

This completes the spring bed-bottom, which may be made of any size desired and to contain a greater or less number of springs, as may be required. It can be folded up in small compass for transportation, and, as soon as unfolded, is ready for use.

I am aware of the patent of Whitehead and Kittle, and make no claim to anything there shown.

Having thus fully described my invention, what I claim as new, and desire to secure by Letters Patent, is—

The bed-bottom composed of the metal bars B, having their ends formed into hinge-butts, which are connected by a wire, the wooden slats A attached directly to the center of each section B, and having the spiral springs C C arranged in alternate order and coupled together by the links *b b*, all as and for the purpose set forth.

In testimony that I claim the foregoing as my own I affix my signature in presence of two witnesses.

EDWIN P. FOWLER.

Witnesses:
JAMES T. HANRAHAN,
ALFRED C. SQUIRES.